Feb. 23, 1954     D. C. TAO     2,669,890
BORING BAR
Filed June 19, 1953
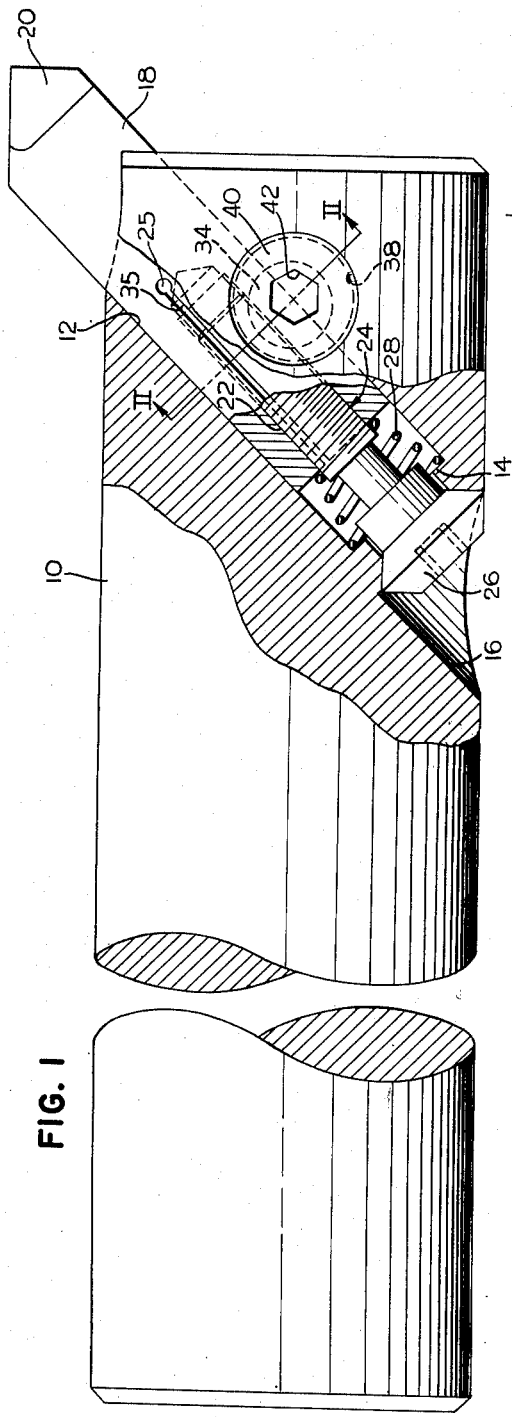
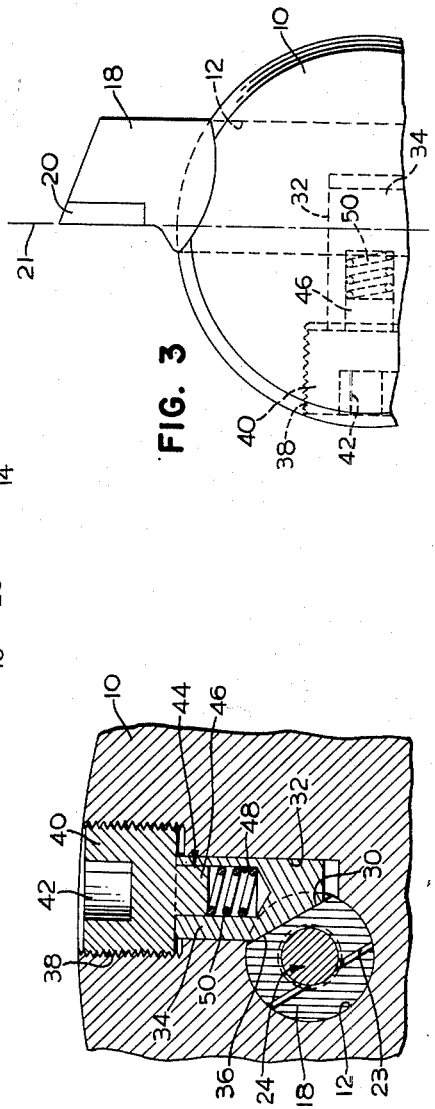
INVENTOR.
DEH C. TAO
BY
Oldham & Oldham
ATTORNEYS Patented Feb. 23, 1954

2,669,890

UNITED STATES PATENT OFFICE 2,669,890

BORING BAR

Deh C. Tao, Akron, Ohio, assignor to Portage Machine Co., Summit County, Ohio, a corporation of Ohio Application June 19, 1953, Serial No. 362,923

10 Claims. (Cl. 77—56)

This invention relates to boring bars for machine tools, and, more particularly, relates to a boring bar adjustably positioning a cutting tool.

It is the general object of my invention to provide a boring bar of the type described characterized by simplicity and inexpensiveness of manufacture, ease and rapidity of cutter adjustment, freedom of backlash during adjustment, rigidity and durability in use, and by long and maintenance-free life.

Another object of my invention is to provide a boring bar adjustably carrying a cutter tool which is held in backlash free position by spring means until locked in place in cutting position.

Another object of my invention is to provide a boring bar adjustably positioning a cutter having a flat thereon with which a non-rotatable resiliently urged wedge clamp is adapted to be locked to rigidly position the cutter.

The foregoing objects of my invention, and other objects which will become apparent as the description proceeds, are achieved by providing in combination a boring bar having an opening there, a cutter bar slidably received in the opening, a cutter tip formed on the outermost end of the cutter bar, the opening in the boring bar being positioned to locate the cutter top on the center line of the boring bar, a shoulder formed on one end of the opening in the boring bar, spring means between the shoulder and the cutter bar urging the cutter blank outwardly to take up backlash, an adjusting screw having a head engaging with the opposite side of the shoulder from the spring means and a threaded shank screwing into a bore in the cutter bar, the cutter bar having a slot therein extending tangentially of the bore, the cutter bar being formed with a flat diametrically opposite to the slot, a wedge clamp slidably received in a recess in the boring bar so that the wedge clamp engages with the flat, the recess being formed with an eccentrically positioned counterbore, a lock screw having threaded engagement with the counterbore, a freely rotary stud and socket connection between the lock screw and wedge clamp positioned axially of the lock screw and eccentrically of the wedge clamp to prevent rotation of the wedge clamp, and usually resilient means urging the lock screw and wedge clamp apart so that the wedge clamp is held lightly in engagement with the flat of the cutter bar to take up backlash when the lock screw is not in locking relation with the wedge clamp.

In the drawings, Fig. 1 illustrates in broken-away, longitudinal sectional view a boring bar constituting one embodiment of the principles of the invention;

Fig. 2 is an enlarged fragmentary cross-sectional view taken substantially on line II—II of Fig. 1 and better illustrating the details of the wedge clamp for the cutter carried by the boring bar; and Fig. 3 is an end view of the bar of Fig. 1.

Having reference to the drawings, the numeral 10 indicates the boring bar, usually cylindrical, and formed with an opening 12 usually but not necessarily near one end thereof. The opening 12 is ordinarily cylindrical, and is usually obliquely directed in the manner illustrated, although sometimes the opening is directed laterally of the bar 10. The opening 12 is provided with a shoulder 14 near the innermost end of the bar, and with a counterbore 16 axially in alignment with the opening 12 and terminating adjacent the shoulder 14.

Slidably received in the opening 12 is a cutter bar 18 formed at its outer end with a cutting surface or a brazed-on cutter tip 20, and having a tapped bore 22 extending into its opposite end. As best seen in Fig. 3, the opening 12 is positioned to one side of a diameter of the bar 10 and so as to bring the cutting edge of the cutter bar on the center line 21 of the bar, so as to insure accuracy of the cutting action of the tool assembly. Also, the cutter bar is formed with a slot 23 which extends longitudinally of the bar a somewhat greater length than the length of the bore 22, and with the plane of the slot 23 lying substantially tangent to the top of the threads of the bore. A hole 25 drilled in the end of the slot relieves stress concentration.

An adjusting screw, indicated as a whole by the numeral 24, has a head 26 engaging with the shoulder 14, usually the head 26 and shoulder 14 being formed with complementary bevels in the manner illustrated. The head of the screw 24 is usually appropriately calibrated, if desired, to allow for accurate adjustment of the cutter bar, and the screw 24 is provided with a threaded shank screwing into the tapped bore 22 of the cutter blank 18. A compression spring 28 is provided between the shoulder 14 and the inner end of the cutter bar 18 so that normally the cutter bar 18 is urged outwardly of the opening 12, this action keeping the head 26 of the screw 24 firmly seated against the shoulder 14 and substantially eliminating backlash in the assembly and insuring alignment of the screw 24 in its tapered seat.

Additionally, until such time as the cutter bar 18 is locked in adjusted position the spring 28 allows for resilient inward movement of the cutter bar 18 in the hole 12.

Referring now to Fig. 2 of the drawings, the cutter bar 18 is provided with a flat 30 on the side diametrically opposite to the slot 23 and positioned adjacent a recess 32 extending into the boring bar 10, usually at right angles to the opening 12. The recess 32 slidably receives a wedge clamp 34 having a tapered surface 36 which engages with the flat 30 on the cutter bar 18. The term "flat" as employed herein and in the claims is intended to cover any wedging surfaces even if not flat.

Associated with the recess 32 is an eccentric counterbore 38 which is tapped to threadably receive a lock screw 40 formed with suitable means for turning it, for example, a socket 42 adapted to receive an Allen set screw wrench. As stated, the counterbore 38 is positioned eccentrically of the recess 32, but is in axial alignment with a rotary connection, indicated as a whole by the numeral 44, between the lock screw 40 and the wedge clamp 34. The rotary connection 44 conveniently takes the form of a stud 46 formed on the bottom of the lock screw 40 and rotatably received in a socket 48 formed in the wedge clamp 34. A compression spring 50 carried in the socket 48 and acting against the stud 46 serves to resiliently urge the wedge clamp 34 against the cutter bar 18 at all times to eliminate blacklash, but with the cutter bar 18 being locked in position by the wedge clamp 34 only when the bottom of the lock screw 40 engages with the top of the wedge clamp 34, in the manner shown in Figure 2, to forcibly clamp the flat 30 on the cutter bar 18 with the taper 36 on the wedge clamp 34. This clamping action on the flat of the cutter bar 18 applies force laterally to the bar to lock it laterally in the opening 12, the clearance provided by the slot 23 causing the cutter bar 18 to be clamped tightly against screw 24 to thereby hold the screw and bar in locked position even through periods of severe vibration.

Due to the fact that the rotary connecting means 44 between the lock screw 40 and the wedge clamp 34 is positioned eccentrically of the wedge clamp 34 the wedge clamp is held against rotary movement. This means that at all times the taper 36 on the wedge clamp and the flat 30 on the cutter bar are held in alignment even in the absence of the spring 50.

It is believed from the foregoing that the operation of the improved cutter bar of my invention will be fully evident. Suffice it to say that a loosening turn of the lock screw 40, as by engagement of an Allen wrench in the socket 42 releases the wedge clamp 34 from clamping engagement with the cutter bar 18 whereupon rotary adjustment of the screw 26 can be effected to position the cutting surface or tip 20 of the cutter bar 18 to the desired cutting position. Tightening of the lock screw 40 rigidly clamps the cutter bar 18 in the adjusted position with a rigidity and positiveness which is maintained over long periods of use in spite of vibration. Removal of the cutter bar for application of a new cutting tip, or for grinding, is a simple matter, and it will be recognized that the objects of the invention have been achieved.

While in accord with the patent statutes one embodiment of the invention has been particularly illustrated and described, it is to be particularly understood that I am not to be limited thereto or thereby, but that the scope of my invention is defined in the appended claims.

I claim:

1. In combination, a boring bar having an obliquely-directed cylindrical opening near one end, a cutter bar slidably received in the opening, a brazed-on cutter tip on the outermost end of the cutter bar, the position of the opening being such as to position the cutting edge of the cutting tip on the center line of the boring bar, a shoulder formed on the innermost end of the opening in the boring bar, a spring between the shoulder and the cutter bar urging the cutter bar outwardly, an adjusting screw having a head engaging with the opposite side of the shoulder from the spring and a threaded shank screwing into a bore in the cutter bar, the cutter bar being formed with a flat and a diametrically-opposed slot, the slot being substantially tangent to the bore in the cutter bar, a wedge clamp slidably received in a recess in the boring bar directed substantially at right angles to the opening so that the wedge clamp engages with the flat, the recess being formed with an eccentrically positioned counterbore, a lock screw having threaded engagement with the counterbore, a freely rotary engagement between the lock stud and socket connection between the lock screw and wedge clamp positioned axially of the lock screw and eccentrically of the wedge clamp, and resilient means urging the lock screw and wedge clamp apart so that the wedge clamp is held lightly in engagement with the flat of the cutter bar.

2. In combination, a boring bar having an obliquely-directed cylindrical opening near one end, a cutter bar slidably received in the opening, a brazed-on cutter tip on the outermost end of the cutter bar, a shoulder formed on the innermost end of the opening in the boring bar, a spring between the shoulder and the cutter bar urging the cutter bar outwardly, an adjusting screw having a head engaging with the opposite side of the shoulder from the spring and a threaded shank screwing into a bore in the cutter bar, the cutter bar being formed with a flat, a wedge clamp slidably received in a recess in the boring bar directed substantially at right angles to the opening so that the wedge clamp engages with the flat, the recess being formed with an eccentrically positioned counterbore, a lock screw having threaded engagement with the counterbore, a freely rotary stud and socket connection between the lock screw and wedge clamp positioned axially of the lock screw and eccentrically of the wedge clamp, and resilient means urging the lock screw and wedge clamp apart so that the wedge clamp is held lightly in engagement with the flat of the cutter bar.

3. In combination, a boring bar having an opening therein, a cutter bar slidably received in the opening, a cutter tip formed on the outermost end of the cutter bar, the position of the opening being such as to position the cutting edge of the cutting tip on the center line of the boring bar, a shoulder formed on one end of the opening in the boring bar, a spring between the shoulder and the cutter bar urging the cutter bar outwardly, an adjusting screw having a head engaging with the opposite side of the shoulder from the spring and a threaded shank screwing into a bore in the cutter bar, the cutter bar being formed with a flat and longitudinally extending slot, a wedge clamp slidably received in a recess in the boring bar directed substantially at right angles to the opening so that the wedge clamp engages with the flat, the recess being formed with an eccentrically positioned counterbore, a lock screw having threaded engagement with the counterbore, a freely rotary stud and socket connection between the lock screw and wedge clamp positioned axially of the lock screw and eccentrically of the wedge clamp, and resilient means urging the lock screw and wedge clamp apart so that the wedge clamp is held lightly in engagement with the flat of the cutter bar.

4. In combination, a boring bar having an opening therein, a cutter bar slidably received in the opening, a cutter tip formed on the outermost end of the cutter bar, a shoulder formed on one end of the opening in the boring bar, a spring between the shoulder and the cutter bar urging the cutter bar outwardly, an adjusting screw having a head engaging with the opposite side of the shoulder from the spring and a threaded shank screwing into a bore in the cutter bar, the cutter bar being formed with a flat, a wedge clamp slidably received in a recess in the boring bar directed substantially at right angles to the opening so that the wedge clamp engages with the flat, the recess being formed with an eccentrically positioned counterbore, a lock screw having threaded engagement with the counterbore, a freely rotary stud and socket connection between the lock screw and wedge clamp positioned axially of the lock screw and eccentrically of the wedge clamp, and resilient means urging the lock screw and wedge clamp apart so that the wedge clamp is held lightly in engagement with the flat of the cutter bar.

5. In combination, a boring bar having an opening therein, a cutter bar slidably received in the opening, a cutter edge provided on the outermost end of the cutter bar, the cutting edge being on the center line of the boring bar, a shoulder formed on one end of the opening in the boring bar, a spring between the shoulder and the cutter bar urging the cutter bar outwardly, an adjusting screw having a head engaging with the opposite side of the shoulder from the spring and a threaded shank screwing into a bore in the cutter bar, the cutter bar being formed with a flat, a wedge clamp slidably received in a recess in the boring bar so that the wedge clamp engages with the flat, and means for tightening the wedge clamp against the boring bar, the cutter bar being slotted so as to clamp on the screw when the wedge clamp is tightened.

6. In combination, a boring bar having an opening therein, a cutter bar slidably received in the opening, a cutter edge provided on the outermost end of the cutter bar, the cutting edge being on the center line of the boring bar, a shoulder formed on one end of the opening in the boring bar, a spring between the shoulder and the cutter bar urging the cutter bar outwardly, an adjusting screw having a head engaging with the opposite side of the shoulder from the spring and a threaded shank screwing into a bore in the cutter bar, the cutter bar being formed with a flat, a wedge clamp slidably received in a recess in the boring bar so that the wedge clamp engages with the flat, and means for tightening the wedge clamp against the boring bar.

7. In combination, a boring bar having an opening therein, a cutter bar slidably received in the opening, a cutter edge provided on the outermost end of the cutter bar, a shoulder formed on one end of the opening in the boring bar, a spring between the shoulder and the cutter bar urging the cutter bar outwardly, an adjusting screw having a head engaging with the opposite side of the shoulder from the spring and a threaded shank screwing into a bore in the cutter bar, the cutter being formed with a flat, a wedge clamp slidably received in a recess in the boring bar so that the wedge clamp engages with the flat, and means for tightening the wedge clamp against the boring bar, the cutter bar being slotted so as to clamp on the screw when the wedge clamp is tightened.

8. In combination, a boring bar having an opening therein, a cutter bar slidably received in the opening, means for adjusting the cutter bar axially of the opening, the cutter bar being slotted and formed with an opposed flat, a wedge clamp slidably received in a recess in the boring bar directed substantially at right angles to the opening so that the wedge clamp engages with the flat, the recess being formed with an eccentrically positioned counterbore, a lock screw having threaded engagement with the counterbore, a freely rotary stud and socket connection between the lock screw and wedge clamp positioned axially of the lock screw and eccentrically of the wedge clamp, and resilient means urging the lock screw and wedge clamp apart so that the wedge clamp is held lightly in engagement with the flat of the cutter bar.

9. In combination, a boring bar having an opening therein, a cutter bar slidably received in the opening, means for adjusting the cutter bar axially of the opening, the cutter bar being formed with a flat, a wedge clamp slidably received in a recess in the boring bar directed substantially at right angles to the opening so that the wedge clamp engages with the flat, the recess being formed with an eccentrically positioned counterbore, a lock screw having threaded engagement with the counterbore, a freely rotary stud and socket connection between the lock screw and wedge clamp positioned axially of the lock screw and eccentrically of the wedge clamp, and resilient means urging the lock screw and wedge clamp apart so that the wedge clamp is held lightly in engagement with the flat of the cutter bar.

10. In combination, a boring bar having an opening therein, a cutter bar slidably received in the opening, means for adjusting the cutter bar axially of the opening, the cutter bar being formed with a flat, a wedge clamp slidably received in a recess in the boring bar directed substantially at right angles to the opening so that the wedge clamp engages with the flat, the recess being formed with an eccentrically positioned counterbore, a lock screw having threaded engagement with the counterbore, and a freely rotary stud and socket connection between the lock screw and wedge clamp positioned axially of the lock screw and eccentrically of the wedge clamp.

DEH C. TAO.

References Cited in the file of this patent
UNITED STATES PATENTS

| Number | Name | Date |
|---|---|---|
| 2,096,489 | Hassig | Oct. 19, 1937 |
| 2,274,007 | Smith | Feb. 24, 1942 |
| 2,274,244 | Miller | Feb. 24, 1942 |